(12) United States Patent
Wu et al.

(10) Patent No.: US 12,119,508 B2
(45) Date of Patent: Oct. 15, 2024

(54) BATTERY MODULE UNIT, BATTERY MODULE, ENERGY STORAGE SYSTEM, AND ELECTRIC VEHICLE

(71) Applicant: Dongguan Amperex Technology Limited, Dongguan (CN)

(72) Inventors: Mingjie Wu, Dongguan (CN); Xin Wang, Dongguan (CN)

(73) Assignee: Dongguan Amperex Technology Limited, Dongguan (CN)

( * ) Notice: Subject to any disclaimer, the term of this patent is extended or adjusted under 35 U.S.C. 154(b) by 703 days.

(21) Appl. No.: 17/281,470

(22) PCT Filed: Sep. 29, 2020

(86) PCT No.: PCT/CN2020/118847
§ 371 (c)(1),
(2) Date: Mar. 30, 2021

(87) PCT Pub. No.: WO2021/058028
PCT Pub. Date: Apr. 1, 2021

(65) Prior Publication Data
US 2021/0359369 A1      Nov. 18, 2021

(30) Foreign Application Priority Data
Sep. 29, 2019   (CN) .......................... 201910932071.8

(51) Int. Cl.
*H01M 50/262*   (2021.01)
*B60L 50/64*    (2019.01)
(Continued)

(52) U.S. Cl.
CPC ........... *H01M 50/262* (2021.01); *B60L 50/64* (2019.02); *H01M 50/209* (2021.01); *H01M 50/233* (2021.01); *H01M 2220/20* (2013.01)

(58) Field of Classification Search
CPC .... B60L 50/64; H01M 50/262; H01M 50/209
(Continued)

(56) References Cited

U.S. PATENT DOCUMENTS 9,163,887 B2 * 10/2015 Katayama ......... H01M 10/6554
10,312,487 B2 * 6/2019 Kim ..................... H01M 50/209
(Continued)

FOREIGN PATENT DOCUMENTS

| CN | 104466049 A | 3/2015 |
|----|-------------|--------|
| CN | 105584345 A | 5/2016 |

(Continued)

OTHER PUBLICATIONS

International Search Report dated Dec. 29, 2020, issued in counterpart International Application No. PCT/CN2020/118847. (4 pages).
(Continued)

*Primary Examiner* — Richard V Muralidar
(74) *Attorney, Agent, or Firm* — WHDA, LLP

(57) ABSTRACT

A battery module unit including a plurality of sequentially stacked first brackets and a plurality of battery cells. Each first bracket includes a bracket body. A first battery cell group and second battery cell group disposed the opposite side of the first bracket. A connecting structure is disposed at one end of a plurality of the bracket bodies. A fastener is disposed on the first fixing bracket and is fixed to a sidewall of the connecting structure to fix the connecting structure to the first fixing bracket in a stacking direction. The first battery cell group is symmetric to the second battery cell group around a symmetric central axis of the first fixing bracket or around a symmetric central axis of a plurality of the first fixing brackets.

17 Claims, 12 Drawing Sheets

(51) Int. Cl.
*H01M 50/209* (2021.01)
*H01M 50/233* (2021.01)

(58) Field of Classification Search
USPC .................................................. 320/107, 112
See application file for complete search history.

(56) References Cited

U.S. PATENT DOCUMENTS

| | | | |
|---|---|---|---|
| 10,541,395 B2 * | 1/2020 | Bessho | H01M 50/264 |
| 11,289,763 B2 * | 3/2022 | Ito | H01M 10/0486 |
| 2010/0310909 A1 * | 12/2010 | Yun | H01M 50/178 |
| | | | 429/90 |
| 2011/0104521 A1 * | 5/2011 | Kishimoto | H01M 50/213 |
| | | | 429/7 |
| 2011/0104548 A1 * | 5/2011 | Saito | H01M 10/6563 |
| | | | 429/120 |
| 2012/0064386 A1 | 3/2012 | Oguri et al. | |
| 2013/0052516 A1 | 2/2013 | Kim | |
| 2013/0146249 A1 * | 6/2013 | Katayama | H01M 10/613 |
| | | | 165/46 |
| 2013/0260197 A1 * | 10/2013 | Okada | H01M 50/209 |
| | | | 429/100 |
| 2014/0295227 A1 | 10/2014 | Aoki | |
| 2015/0079451 A1 | 3/2015 | Jeong et al. | |
| 2016/0036028 A1 | 2/2016 | Tsuruta et al. | |
| 2016/0133997 A1 | 5/2016 | Vejalla et al. | |
| 2017/0141371 A1 | 5/2017 | Toshioka et al. | |
| 2017/0244077 A1 * | 8/2017 | Yuasa | H01G 11/82 |
| 2017/0279094 A1 | 9/2017 | Ueda et al. | |
| 2018/0138473 A1 | 5/2018 | Bessho et al. | |
| 2019/0044119 A1 | 2/2019 | Fernandez-Galindo et al. | |
| 2019/0097193 A1 | 3/2019 | Kovent | |
| 2020/0144580 A1 | 5/2020 | Hong et al. | |
| 2021/0265692 A1 | 8/2021 | Cao et al. | |

FOREIGN PATENT DOCUMENTS

| | | | |
|---|---|---|---|
| CN | 107302070 A | 10/2017 |
| CN | 107732088 A | 2/2018 |
| CN | 207800679 U | 8/2018 |
| CN | 109390540 A | 2/2019 |
| CN | 208522006 U | 2/2019 |
| CN | 109742285 A | 5/2019 |
| CN | 209104207 U | 7/2019 |
| CN | 110233229 A | 9/2019 |
| CN | 209418570 U | 9/2019 |
| CN | 110739422 A | 1/2020 |
| CN | 211350711 U | 8/2020 |
| JP | 2001-236937 A | 8/2001 |
| JP | 2003-346749 A | 12/2003 |
| JP | 2012-064355 A | 3/2012 |
| JP | 2013-045765 A | 3/2013 |
| JP | 2013-122817 A | 6/2013 |
| JP | 2014-107217 A | 6/2014 |
| JP | 2016-033905 A | 3/2016 |
| JP | 2016-062880 A | 4/2016 |
| JP | 2017-091948 A | 5/2017 |
| JP | 2017-147201 A | 8/2017 |
| JP | 2017-157274 A | 9/2017 |
| KR | 20190071454 A | 6/2019 |
| WO | 2013/073046 A1 | 5/2013 |
| WO | 2013/080338 A1 | 6/2013 |
| WO | 2019/171469 A1 | 9/2019 |

OTHER PUBLICATIONS

Written Opinion of the International Searching Authority (Form PCT/ISA/237) dated Dec. 29, 2020, issued in counterpart International Application No. PCT/CN2020/118847. (5 pages).
Office Action dated Jul. 21, 2021, issued in counterpart CN application No. 201910932071.8, with English translation. (23 pages).
Office Action dated Nov. 17, 2021, issued in counterpart CN application No. 201910932071.8, with English translation. (18 pages).
Office Action dated Apr. 26, 2022, issued in counterpart JP application No. 2021-516891, with English translation. (19 pages).
Office Action dated Dec. 6, 2022, issued in counterpart JP application No. 2021-516891, with English translation. (14 pages).
Office Action dated Jun. 27, 2023, issued in counterpart JP application No. 2021-516891, with English translation. (5 pages).
Office Action dated Jun. 26, 2023, issued in counterpart AU application No. 2020353033. (4 pages).
Office Action dated Dec. 14, 2023, issued in counterpart AU application No. 2020353033. (4 pages).
Extended (Supplementary) European Search Report dated May 12, 2022, issued in counterpart EP application No. 20866938.2. (39 pages).
Office Action dated Dec. 19, 2023, issued in counterpart JP application No. 2021-516891. (4 pages).

* cited by examiner

BATTERY MODULE UNIT, BATTERY MODULE, ENERGY STORAGE SYSTEM, AND ELECTRIC VEHICLE

CROSS REFERENCE TO THE RELATED APPLICATIONS

The present application is a National Stage application of PCT international application: PCT/CN2020/118847, filed on 29 Sep. 2020, which claims the benefit of priority from the China Patent Application No. 201910932071.8, filed on 29 Sep. 2019, the disclosure of which is hereby incorporated by reference in its entirety.

TECHNICAL FIELD

This application relates to the field of batteries, and in particular, to a battery module unit, a battery module containing the battery module unit, an energy storage system, and an electric vehicle.

BACKGROUND

In a charging process of a battery, insertion of lithium ions occurs on an anode, and a battery module expands. After being used for a long time, a battery system irreversibly deforms and expands. Uneven expansion of a battery cell leads to loss of an electrolytic solution in a local part of the battery cell. As a slight consequence, a pressure difference between modules increases, and a structure of the battery system fails to work properly. As a severe consequence, the battery cell is overcharged or over-discharged, the electrolytic solution is decomposed, and the battery cell swells to catch fire and explode.

SUMMARY

In view of the foregoing situation, it is necessary to provide a battery module unit to make a battery cell expand evenly.

A battery module unit, including a plurality of sequentially stacked first brackets, where each first bracket includes a bracket body, and a battery cell is accommodated between two adjacent bracket bodies, the plurality of first brackets include at least one first fixing bracket, and at least one the first fixing bracket is disposed between other first brackets; at least one battery cell on one side of the first fixing bracket forms a first battery cell group; at least one battery cell on the other side of the first fixing bracket forms a second battery cell group; and a connecting structure, disposed at one end of a plurality of the bracket bodies; where a fastener is disposed on the bracket body of the first fixing bracket, and the fastener of the first fixing bracket is fixed to the connecting structure so that the connecting structure is fixed to the first fixing bracket in a first direction, where the first direction is a stacking direction of the plurality of first brackets; and the first battery cell group is symmetric to the second battery cell group around a symmetric central axis of the first fixing bracket, or the first battery cell group is symmetric to the second battery cell group around a symmetric central axis of a plurality of the first fixing brackets.

According to some embodiments of this application, a quantity of battery cells in the first battery cell group is equal to that in the second battery cell group.

According to some embodiments of this application, the fastener includes a first bulge, a first positioning slot corresponding to the first bulge is disposed on a sidewall of the connecting structure, and the first positioning slot fits with and is fixed to the first bulge.

According to some embodiments of this application, the fastener includes a second bulge. the second bulge and the first bulge are located on two sides of the bracket body respectively. A second positioning slot corresponding to the second bulge is disposed on one side of the connecting structure away from the first positioning slot, and the second positioning slot fits with and is fixed to the second bulge.

According to some embodiments of this application, each first bracket includes the fastener. The fastener includes a first bulge and a clasp. The first bulge and the clasp are located on two sides of the connecting structure respectively. The first bulge abuts against the connecting structure. The clasp is clasped with the connecting structure.

According to some embodiments of this application, the clasp includes two intersecting abutting surfaces. One of the abutting surfaces and the bracket body abut on two opposite sides of the connecting structure in opposite directions. The other abutting surface and the first bulge abut on the two opposite sides of the connecting structure in opposite directions.

According to some embodiments of this application, the battery module unit further includes two second brackets. The two second brackets are disposed on two sides of the plurality of first brackets along the first direction. The battery cell is accommodated between each second bracket and an adjacent first bracket. A protruding portion is disposed on the second bracket. Two lugs are disposed on two sides of the connecting structure along the first direction respectively, and the two lugs are fixed to the protruding portion of the second bracket respectively.

According to some embodiments of this application, at least one set of notch and inset are disposed on both sides of the bracket body of the first bracket along the first direction. The notch of the first bracket is able to fit with an inset of another adjacent first bracket.

According to some embodiments of this application, the notches and the insets are symmetrically disposed on sidewalls of the bracket body that are located on two sides of the connecting structure. The notches and the insets located on two sides of each sidewall are symmetrically distributed. Of two adjacent first brackets, one is mounted by rotating 180° against the other in a plane perpendicular to the first direction.

According to some embodiments of this application, each first bracket includes the fastener, and the fastener includes a clasp. the clasp includes two intersecting abutting surfaces. One of the abutting surfaces and the bracket body abut on two opposite sides of the connecting structure in opposite directions. The other abutting surfaces of two clasps located on two sides of the connecting structure abut on the two opposite sides of the connecting structure in opposite directions.

According to some embodiments of this application, the battery module unit further includes a busbar configured to connect tabs of the battery cell. The busbar is fixed to the connecting structure.

According to some embodiments of this application, a positioning pin is disposed on at least one first bracket, and a corresponding positioning hole is disposed on the connecting structure. The positioning pin is able to run through the corresponding positioning hole.

According to some embodiments of this application, the positioning pin is able to move a preset distance in the positioning hole along the first direction.

According to some embodiments of this application, a collection terminal is further disposed on the busbar, and the collection terminal is located on one side of the busbar.

According to some embodiments of this application, the busbar is connected to the fixing bracket by hot melting or by an adhesive or screw threads.

This application further discloses a battery module, including at least one battery module unit described above, and a binding tape. The binding tape is disposed outside the at least one battery module unit to fix the battery module unit.

This application further discloses an energy storage system. The energy storage system includes the foregoing battery module unit or battery module.

This application further discloses an electric vehicle. The electric vehicle includes the foregoing battery module unit or battery module.

In the battery module unit, at least one first fixing bracket in a plurality of first brackets is fixed to the connecting structure, and remaining first brackets can move along the first direction under an expansion effect of the battery cell. The first battery cell group is symmetric to the second battery cell group around the symmetric central axis of the first fixing bracket or around the symmetric central axis of the plurality of the first fixing brackets, where the first battery cell group and the second battery cell group are located on two sides of the first fixing bracket respectively. In this way, the battery cells in the first battery cell group and the second battery cell group expand evenly along the first direction.

REFERENCE NUMERALS

Figure 1:
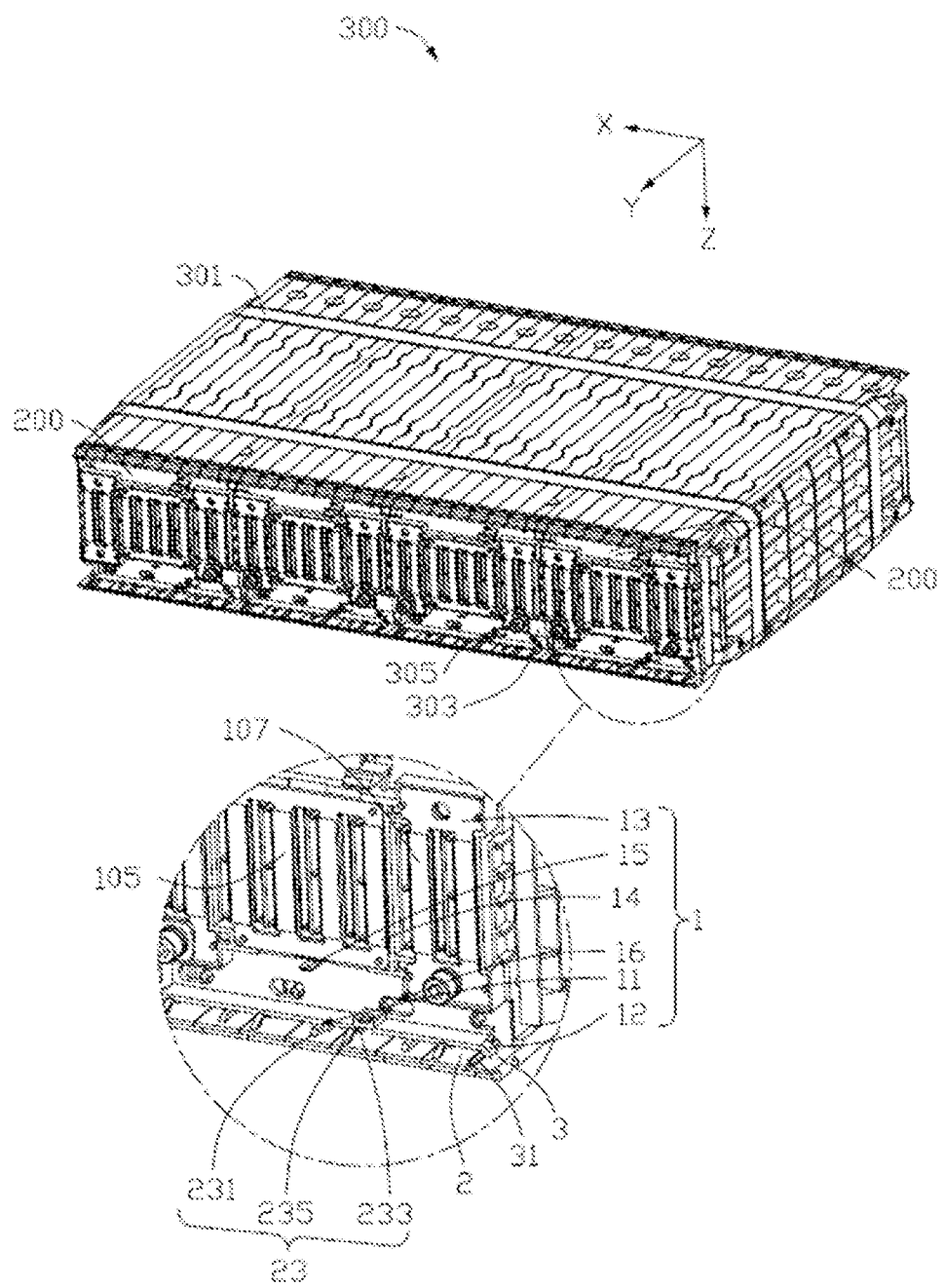
FIG. 1 is a schematic structural diagram of an energy storage system according to a first embodiment of this application.

Energy storage system 300
Binding tape 301
Connecting plate 303
Fastener 305
Battery module 200
Battery module units 100, 100', 100"
First end 101
Second end 103
First battery cell group 105
Second battery cell group 107
Battery cell 1001
Connecting structures 1, 4
First positioning slot 11
Second positioning slot 11a
Lugs 12, 42
Busbars 13, 14
Collection terminal 15
Positioning hole 16
Threaded hole 17
First bracket 2
First fixing bracket 2a
Bracket body 21
Sidewall 211
Fastener 23
First bulges 231, 231a
Second bulges 233, 233a
Clasp 235
Abutting surface 2351
Notches 24, 24a, 34, 34a
Bottom wall 241
Insets 25, 25a, 35, 35a
Positioning pin 26
Second bracket 3
Protruding portion 31
Guide hole 33
Guide rod 36
First direction X
Second direction Y
Third direction Z
Symmetric central axis N, N', N"

This application is further described below with reference to the following specific embodiments and the foregoing drawings.

DETAILED DESCRIPTION OF EMBODIMENTS

The following clearly describes the technical solutions in the embodiments of this application with reference to the drawings hereof. Apparently, the described embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail with reference to drawings. To the extent that no conflict occurs, the following embodiments and the features in the embodiments may be combined with each other.

First Embodiment

Figure 2:
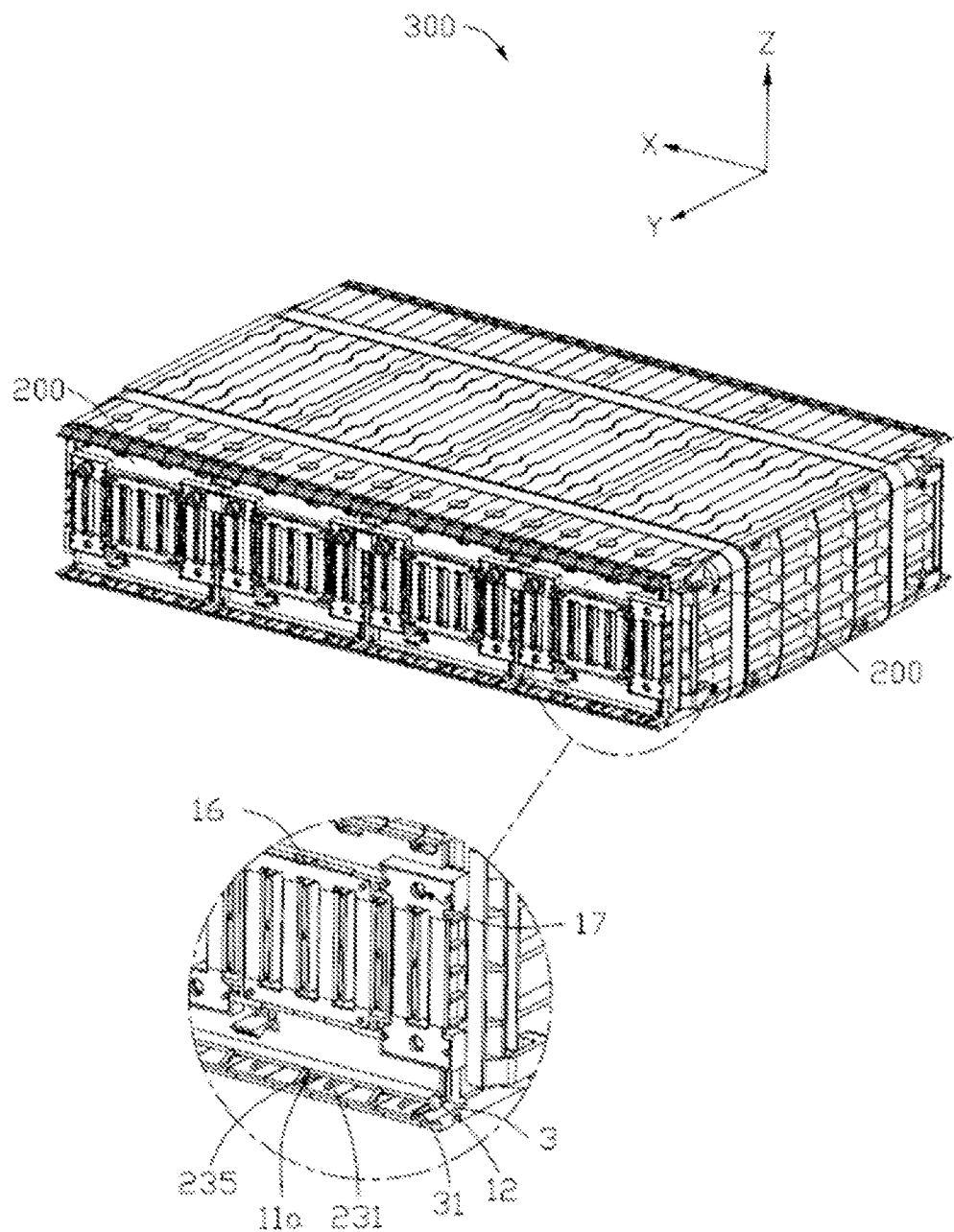
FIG. 2 is a schematic structural diagram of the energy storage system shown in FIG. 1 as viewed from another perspective.

Referring to FIG. 1 and FIG. 2, an energy storage system 300 includes a binding tape 301 and a plurality of battery modules 200. The binding tape 301 is disposed outside the plurality of battery modules 200, and is configured to, but without limitation, fix the plurality of battery modules 200 abreast. The battery modules 200 are four in number, but are not limited to four. Each battery module 200 includes at least one battery module unit 100. In the first embodiment, the battery module unit 100 is one in number, but is not limited to one. Understandably, in other embodiments, the battery module 200 may include two or another quantity of battery module units 100.

Figure 3:
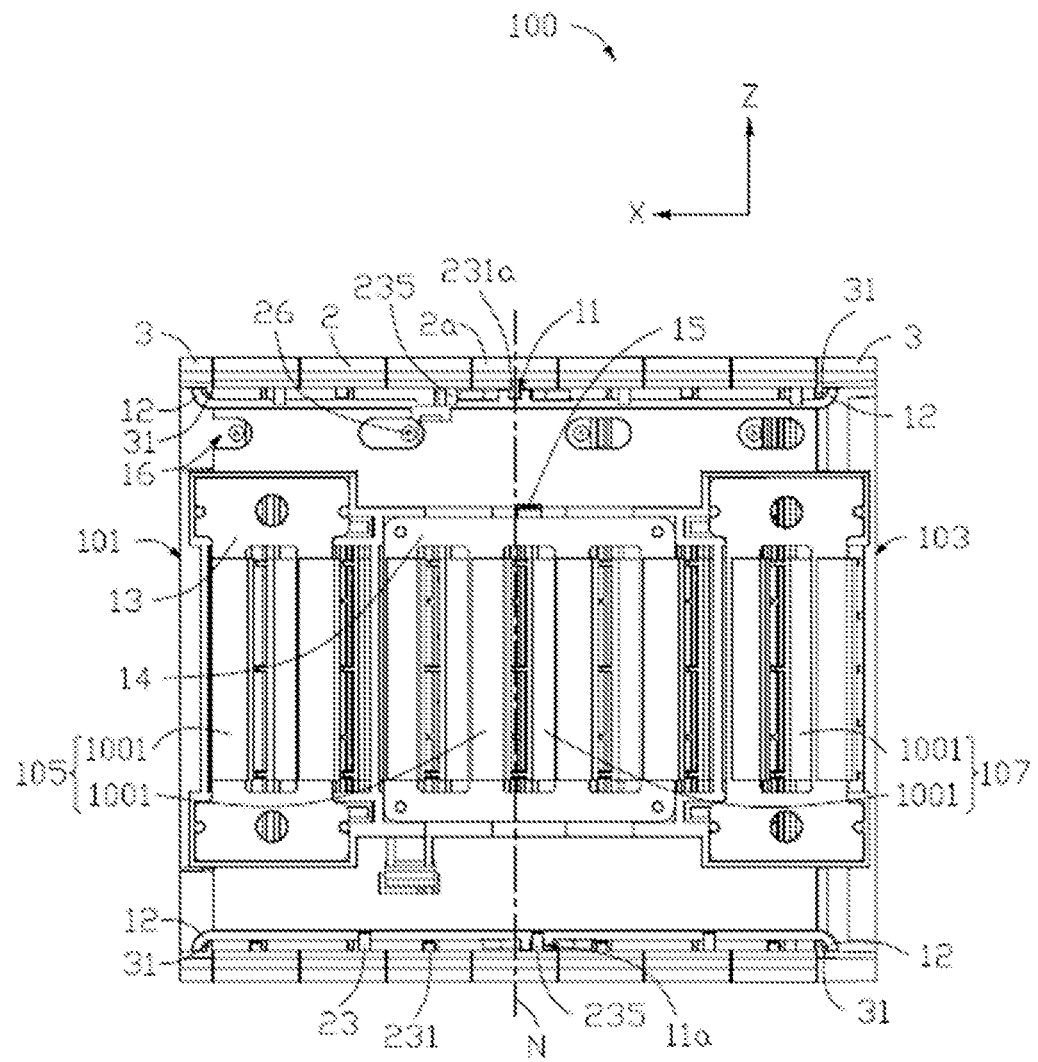
FIG. 3 is a schematic structural diagram of a battery module shown in FIG. 1.
Figure 4:
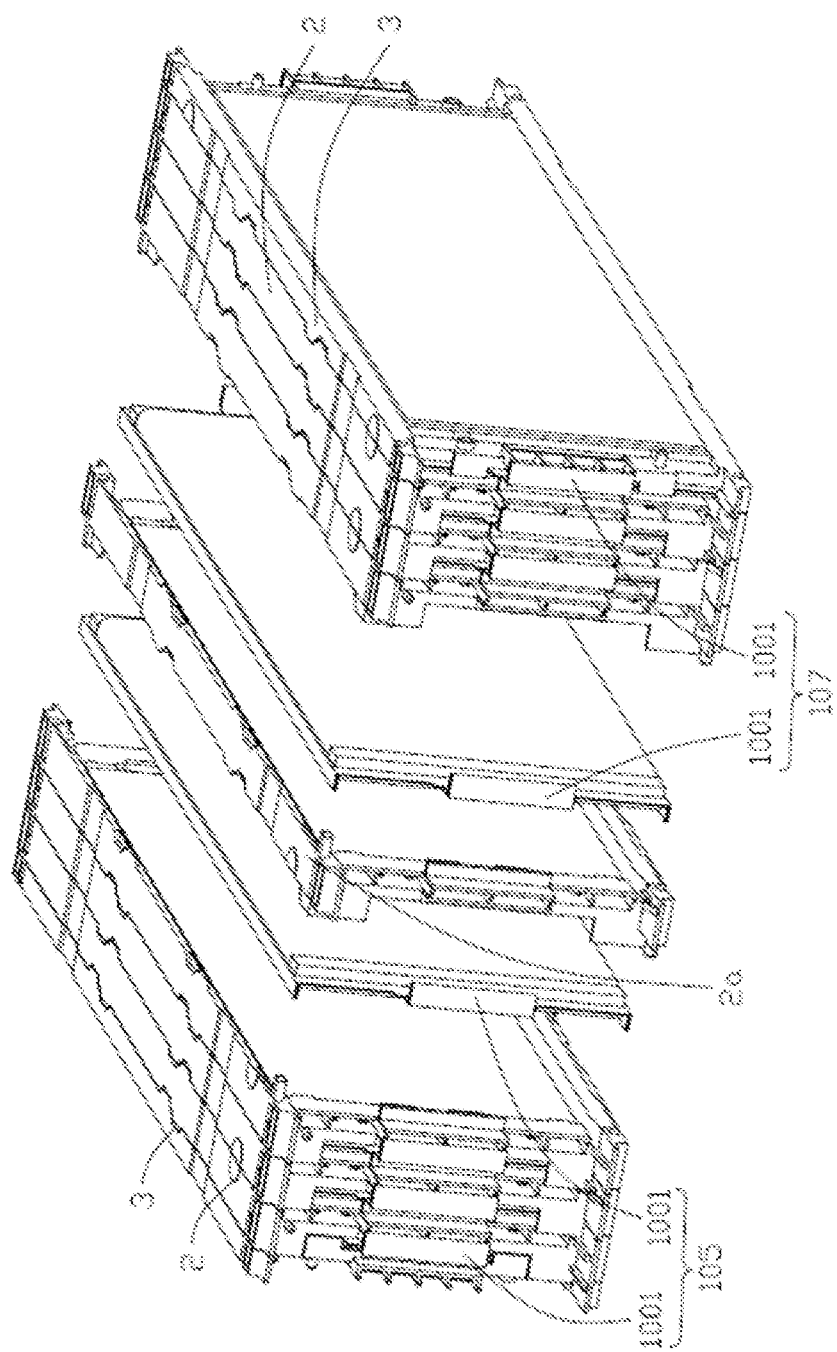
FIG. 4 is a schematic exploded view of a battery module unit shown in FIG. 3 without a connecting structure.

Referring to FIG. 1, FIG. 3, and FIG. 4, the battery module unit 100 includes a first end 101 and a second end 103 that are disposed oppositely, a first battery cell group 105, a second battery cell group 107, a connecting structure 1, and a plurality of sequentially stacked first brackets 2. The first direction X is defined as a stacking direction of the plurality of first brackets 2. In an embodiment, the first direction X is, but without limitation, a direction from the second end 103 to the first end 101. The first bracket 2 includes a bracket body 21 and a fastener 23 disposed on the bracket body 21. The first battery cell group 105 and the second battery cell group 107 each include a plurality of battery cells 1001 sequentially arranged along the first direction X. One battery cell 1001 is accommodated, but without limitation, between two adjacent bracket bodies 21. The connecting structure 1 is disposed at one end of the plurality of bracket bodies 21. The plurality of first brackets 2 include, but without limitation, a first fixing bracket 2a. The first fixing bracket 2a is fixed to the connecting structure 1 so that the connecting structure 1 and the first fixing bracket 2a are fixed in the first direction X. The first fixing bracket 2a is located at a symmetric central axis N of the plurality of first brackets 2 in the first direction X. The symmetric central axis N is perpendicular to the first direction X. In an embodiment, a symmetric central axis of the first fixing bracket 2a in the first direction X is, but without limitation, collinear with the symmetric central axis N. A plurality of battery cells 1001 on one side of the first fixing bracket 2a form the first battery cell group 105, and a plurality of battery cells 1001 on the other side of the first fixing bracket 2a form the second battery cell group 107. Specifically, the first battery cell group 105 is disposed between the first end 101 and one end of the first fixing bracket 2a; and the second battery cell group 107 is disposed between the second end 103 and the other end of the first fixing bracket 2a. The first battery cell group 105 is symmetric to the second battery cell group 107 around the symmetric central axis of the first fixing bracket 2a.

Understandably, in other embodiments, two or another quantity of battery cells 1001 may be accommodated between two adjacent bracket bodies 21.

The stacking direction of the plurality of first brackets 2 is not limited to the direction from the second end 103 to the first end 101. Understandably, in other embodiments, the first direction X may be a direction from the first end 101 to the second end 103.

Referring to FIG. 3, in the first embodiment, the quantity of the first brackets 2 is seven, but is not limited to seven. The first fixing bracket 2a is arranged fourth in the seven first brackets 2. The battery module unit 100 further includes two second brackets 3. The two second brackets 3 are disposed on two sides of the plurality of first brackets 2 along the first direction X respectively. The battery cell 1001 is accommodated between the second bracket 3 and the adjacent first bracket 2. Among the seven first brackets 2, the four battery cells 1001 fixed by the first to third first brackets 2 on one side of the first fixing bracket 2a toward the first end 101 and fixed by the second bracket 3 at the first end 101 form the first battery cell group 105. The four battery cells 1001 fixed by the fifth to seventh first brackets 2 on the other side of the first fixing bracket 2a and fixed by the other second bracket 3 form the second battery cell group 107.

Understandably, in other embodiments, the battery module unit 100 may omit the two second brackets 3. Therefore, among the seven first brackets 2, the three battery cells 1001 fixed by the first to third first brackets 2 on one side of the first fixing bracket 2a form the first battery cell group 105. The three battery cells 1001 fixed by the fifth to seventh first brackets 2 on the other side of the first fixing bracket 2a form the second battery cell group 107.

Referring to FIG. 3, a first bulge 231a is disposed on the first fixing bracket 2a. A first positioning slot 11 corresponding to the first bulge 231a is disposed on the connecting structure 1. The quantity of the first positioning slots 11 is equal to that of the first bulges 231a. The first bulge 231a is fitted into the first positioning slot 11 to settle in the first direction X. Six first brackets 2 other than the first fixing bracket 2a can move along the connecting structure 1 when the battery cell 1001 expands and deforms. A total distance by which the three first brackets 2 on one side of the first fixing bracket 2a can move is equal to a total distance by which the three first brackets on the other side of the first fixing bracket can move. A cumulative expansion distance of the plurality of battery cells 1001 on one side of the first fixing bracket 2a is equal to a cumulative expansion distance of the plurality of battery cells on the other side of the first fixing bracket, so that the first battery cell group 105 and the second battery cell group 107 expand evenly.

Figure 6:
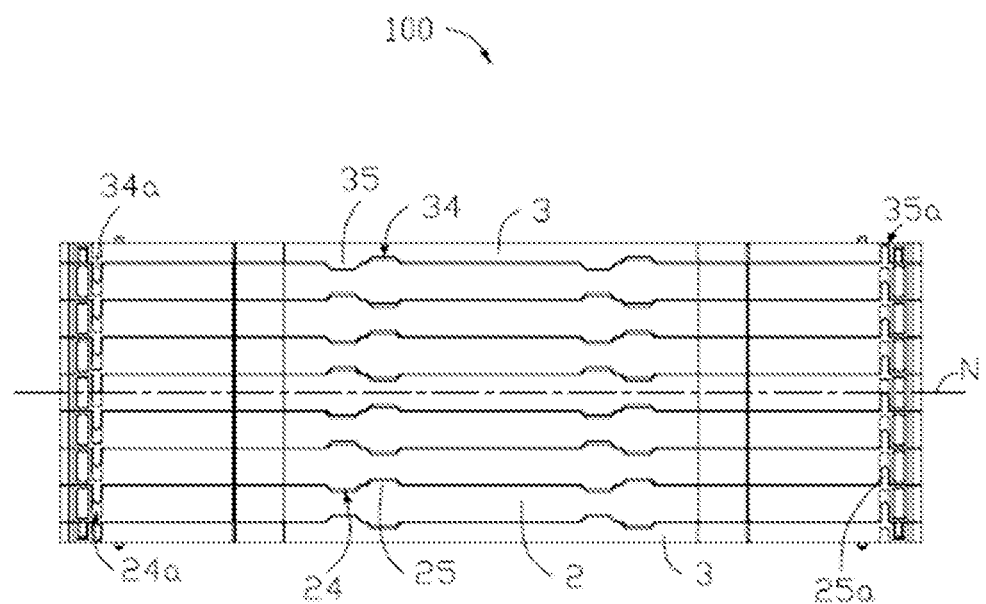
FIG. 6 is a schematic structural diagram of a battery module unit shown in FIG. 3 as viewed from another perspective.

Referring to FIG. 3 and FIG. 6, in a first embodiment, a second bulge 233a is further disposed on the first fixing bracket 2a. The second bulge 233a and the first bulge 231a are located on two sides of the bracket body 21 respectively. A second positioning slot 11a corresponding to the second bulge 233a is disposed on one side of the connecting structure 1 away from the first positioning slot 11. The second bulge 233a is fitted into the second positioning slot 11a to settle in the first direction X and to enhance connection strength between the first fixing bracket 2a and the connecting structure 1.

Referring to FIG. 1 and FIG. 3, the fastener 23 abuts against a sidewall of the connecting structure 1, so that the connecting structure 1 and the first bracket 2 are settled in the second direction Y and in the third direction Z. The first direction X, the second direction Y, and the third direction Z are perpendicular to each other. The second direction Y is, but without limitation, a direction from the bracket body 21 to the connecting structure 1.

Figure 5:
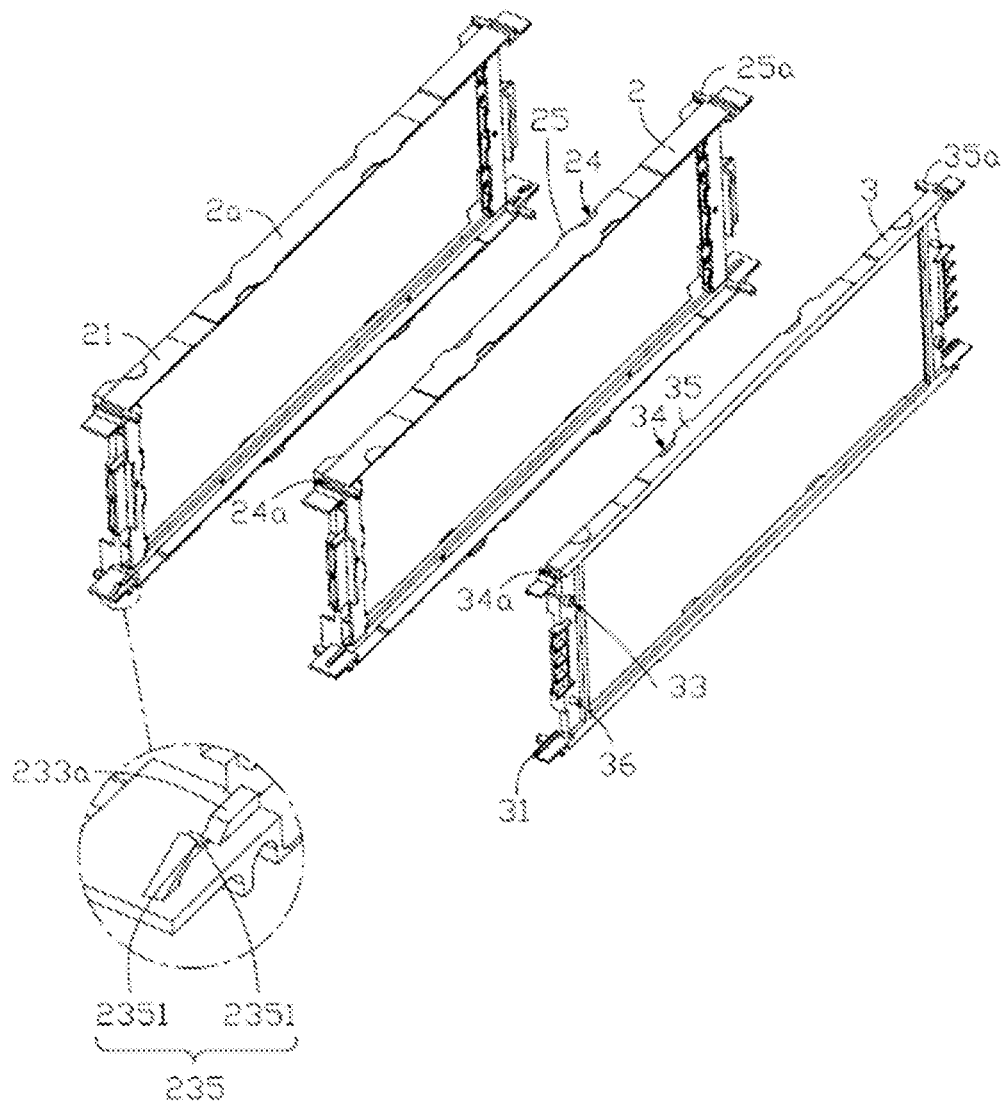
FIG. 5 is a schematic exploded view of adjacent first bracket and second bracket of a battery module unit shown in FIG. 3.

Referring to FIG. 5 and FIG. 6, at least one set of notch 24 and inset 25 are disposed on both sides of the bracket body 21 of the first bracket 2 along the first direction X. The notch 24 of the first bracket 2 is able to fit with an inset 25 of another first bracket 2 that is adjacent, so that the plurality of first brackets 2 are settled in the second direction Y and the third direction Z. Specifically, in the first embodiment, notches 24 and insets 25 are symmetrically disposed on sidewalls 211 of the bracket body 21 that are located on two sides of the connecting structure 1. Two sets of notches 24 and insets 25 are disposed on each side of each sidewall 211, and the notches 24 and the insets 25 located on two sides of the sidewall 211 are symmetrically distributed, but this application is not limited thereto. Of two adjacent first brackets 2, one first bracket 2 is mounted by rotating 180° against the first fixing bracket 2a in a plane perpendicular to the first direction X, and the other first bracket 2 is mounted by rotating 180° against the first fixing bracket 2a in the plane perpendicular to the first direction X, so that the plurality of first brackets 2 abut against each other and settle in the second direction Y and the third direction Z. For example, the inset 25 of the first bracket 2 can be fitted into the notch 24 of the adjacent first fixing bracket 2*a* to abut on a bottom wall 241 of the notch 24. The inset 25 of the first fixing bracket 2*a* is fitted into the notch 24 of the first bracket 2 to abut on the bottom wall 241 of the notch 24. The first bracket 2 and the first fixing bracket 2*a* are both settled in the second direction Y and the third direction Z.

Referring to FIG. 5 and FIG. 6, in the first embodiment, at least one set of notch 24*a* and inset 25*a* is disposed on both sides of the sidewall 211 of the bracket body 21 at the two ends of the battery module unit. The notch 24*a* of the first bracket 2 is able to fit with the inset 25*a* of another first bracket 2 that is adjacent, so that the plurality of first brackets 2 and the first fixing bracket 2*a* are settled in the second direction Y and the third direction Z. Understandably, in other embodiments, the notch 24 and the inset 25, and/or the notch 24*a* and the inset 25*a* are omissible.

Figure 7:
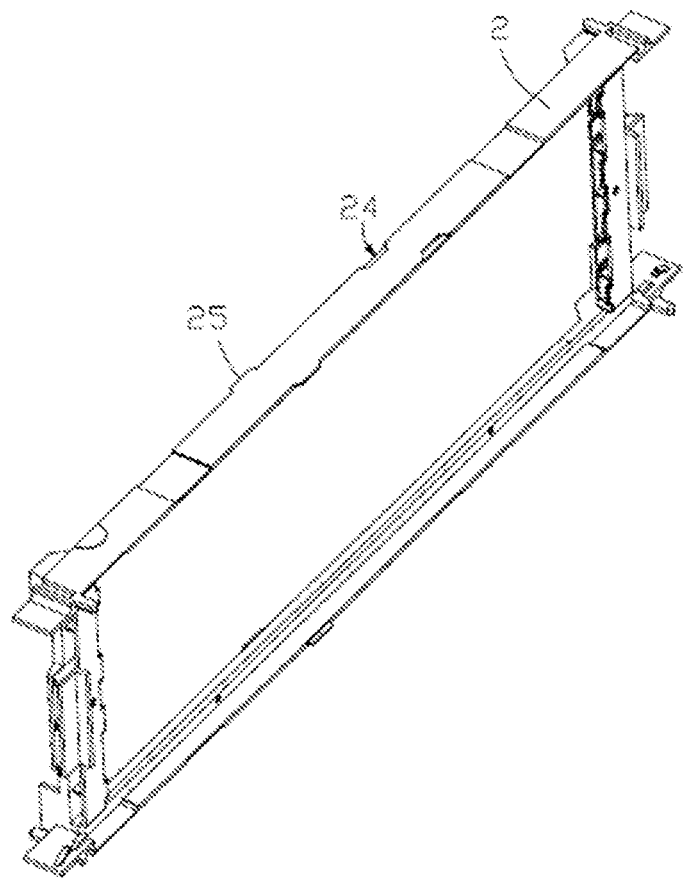
FIG. 7 is a schematic structural diagram of a first bracket shown in FIG. 3 according to another embodiment.
Figure 8:
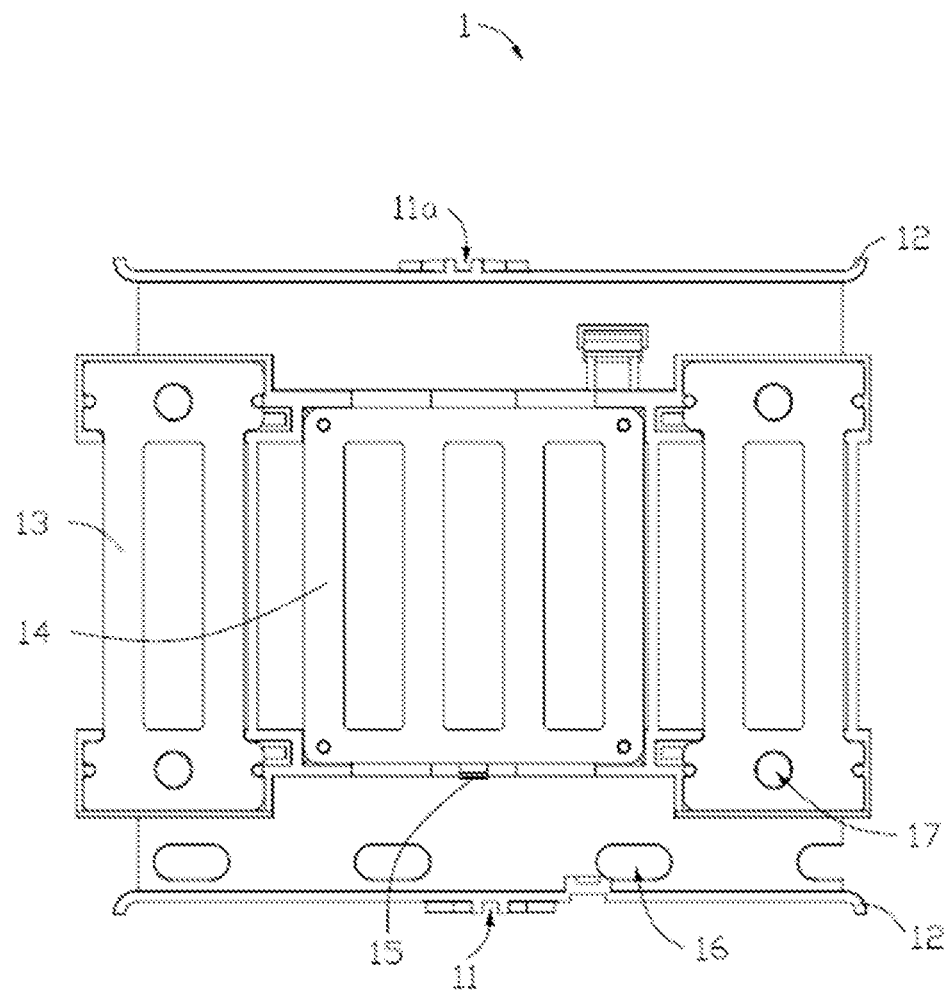
FIG. 8 is a schematic structural diagram of a part of a battery module unit shown in FIG. 3.

Understandably, in other embodiments, merely one set of notch 24 and inset 25 is disposed on one side of the sidewall 211, and the notches 24 and the insets 25 located on two sides of the sidewall 211 are symmetrically distributed, as shown in FIG. 7 and FIG. 8. Alternatively, three sets of notches 24 and insets 25 or another quantity of sets may be disposed on one side of the sidewall 211, as long as the notches 24 of the first bracket 2 fit with the insets 25 of the other first bracket 2 that is adjacent.

Referring to FIG. 6, insets 35 and 35*a* as well as notches 34 and 34*a*, which correspond to the notches 24 and 24*a* as well as the insets 25 and 25*a* of the first bracket 2 respectively, are disposed on the second bracket 3, so that the second bracket 3 and the first bracket 2 are both settled in the second direction Y and the third direction Z.

Referring to FIG. 1 to FIG. 3, the fastener 23 includes a first bulge 231 and a clasp 235. The first bulge 231 is disposed on one side of the bracket body 21 toward the connecting structure 1. The clasp 235 includes two intersecting abutting surfaces 2351. One of the abutting surfaces 2351 and the bracket body 21 abut on two opposite sides of the connecting structure 1 in opposite directions, so that the first bracket 2, the first fixing bracket 2*a*, and the connecting structure 1 are settled along the second direction Y. The other abutting surface 2351 and the first bulge 231 abut on the two opposite sides of the connecting structure 1 in opposite directions, so that the plurality of first brackets 2, the first fixing bracket 2*a*, and the connecting structure 1 are settled along the third direction Z.

Understandably, in other embodiments, the second bulge 233*a* of the first fixing bracket 2*a* and the second positioning slot 11*a* of the connecting structure 1 are omissible. The second bulge 233 of the first bracket 2 and/or the clasp 235 of the first fixing bracket 2*a* are also omissible.

Referring to FIG. 3 and FIG. 5, two opposite protruding portions 31 are disposed on the second bracket 3 along the second direction Y. The two protruding portions 31 abut on two sides of the connecting structure 1 respectively. Two lugs 12 are disposed on the two sides of the connecting structure 1 along the first direction X respectively. Every two lugs 12 abut against outer sides of the two protruding portions 31 of the second bracket 3 respectively, and therefore, the plurality of the first brackets 2, the first fixing bracket 2*a*, and the two second brackets 3 abut against and fix the corresponding battery cells 1001 respectively. In the first embodiment, the connecting structure 1 is injection molded, but this application is not limited thereto. The lugs 12 allow the battery cell 1001, which has expanded to some extent, to drive the first bracket 2 and the second bracket 3 to move in the first direction X, so that the protruding portion 31 of the second bracket 3 is detached from the lug 12 to balance an internal pressure of the plurality of battery cells 1001.

Referring to FIG. 1, FIG. 2, and FIG. 5, in the first embodiment, each first bracket 2 is structurally identical to the first fixing bracket 2*a*, but this application is not limited thereto. The fastener 23 of the first bracket 2 includes a first bulge 231, a second bulge 233, and a clasp 235. The first bulge 231 is structurally identical to the first bulge 231*a*, and the second bulge 233 is structurally identical to the second bulge 233*a*. The first bulge 231/231*a*, the second bulge 233/233*a*, and the clasp 235 are symmetrically disposed on two sides of the first bracket 2 and the first fixing bracket 2*a* along the second direction Y.

Figure 9:
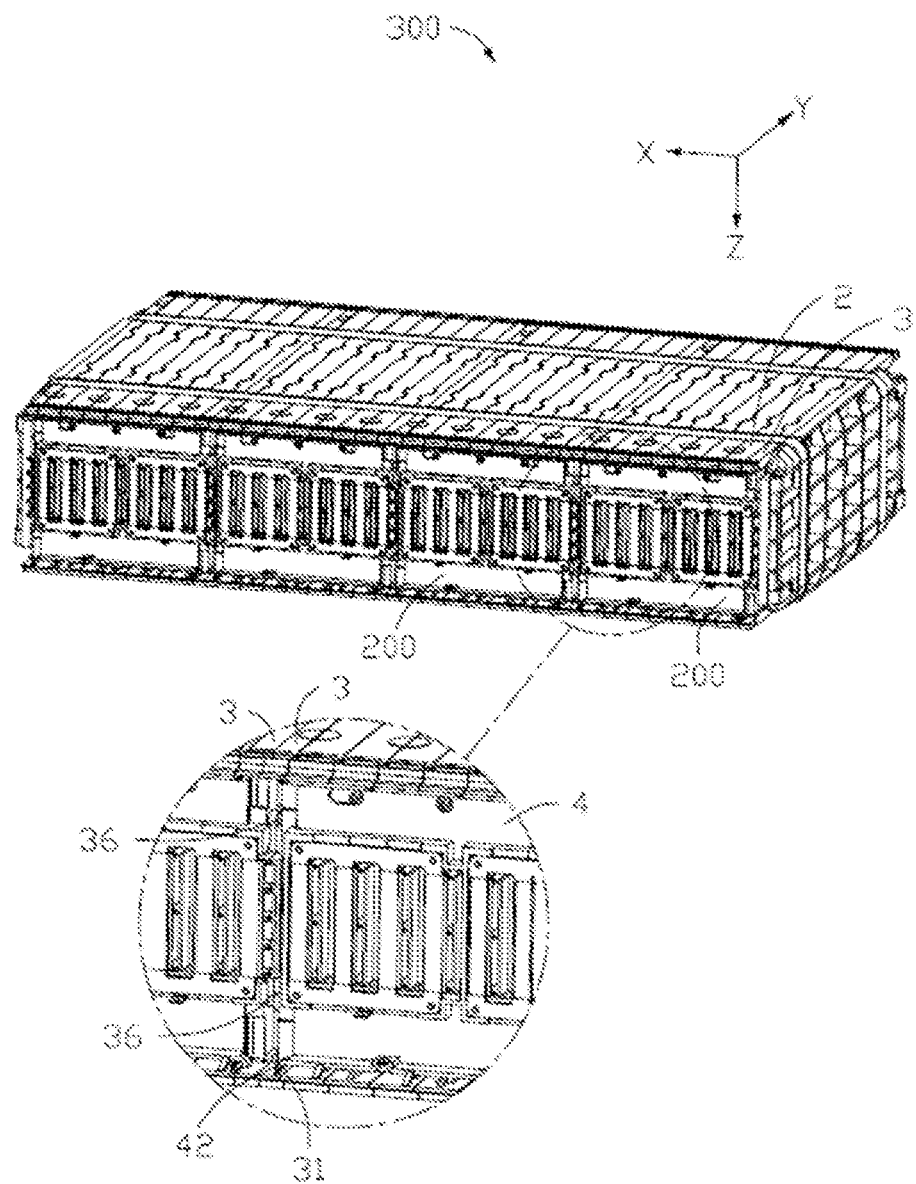
FIG. 9 is a schematic structural diagram of the energy storage system shown in FIG. 1 as viewed from still another perspective.

Referring to FIG. 3 and FIG. 9, the first bulge 231/231*a* is located in the middle of the bracket body 21 along the first direction X, and the second bulge 233/233*a* is disposed on the bracket body 21 along the first direction X, askew to the first bulge 231/231*a*. Correspondingly, the first positioning slot 11 of the connecting structure 1, which corresponds to the first bulge 231*a*, is located in the middle of the connecting structure 1. The second positioning slot 11*a* of the connecting structure 1, which corresponds to the second bulge 233*a*, is disposed askew to the first positioning slot 11 along the first direction X. The second bulge 233/233*a* and the clasp 235 of the first bracket 2 and the first fixing bracket 2*a* are sequentially arranged along the second direction Y. The first bracket 2 and the first fixing bracket 2*a* are injection molded, but this application is not limited thereto. The first bulge 231/231*a*, the second bulge 233/233*a*, and the clasp 235 of the first bracket 2 and the first fixing bracket 2*a* adopt an askew design to facilitate a manufacturing process, and enhance connection strength between the first bracket 2 and the first fixing bracket 2*a* and the connecting structure 1.

Understandably, in other embodiments, the first bulge 231/231*a*, the second bulge 233/233*a*, and the clasp 235 may be located anywhere on the bracket body 21 along the first direction X, as long as the first bulge 231/231*a* and the second bulge 233/233*a* are located on two opposite sides of the connecting structure 1. Referring to FIG. 1 and FIG. 3, two busbars 13 and one busbar 14 are disposed on the connecting structure 1 to connect tabs of the battery cell 1001. The two busbars 13 are located on two sides of the busbar 14 respectively. A collection terminal 15 is further disposed on the busbar 14. The collection terminal 15 is located on one side of the busbar 13 and the busbar 14. The busbar 13 and the busbar 14 are connected to the connecting structure 1 by hot melting, but without being limited to hot melting. For example, in other embodiments, the busbar 13 and the busbar 14 may be connected to the connecting structure 1 by an adhesive or screw threads.

In an embodiment, the busbar 13 and the busbar 14 are copper bars, but without being limited to copper bars.

Referring to FIG. 3, a positioning pin 26 is disposed on one side of at least one first bracket 2. A corresponding positioning hole 16 is disposed on the connecting structure 1. Specifically, the positioning hole 16 is located on one side of the busbar 13 and the busbar 14 toward the collection terminal 15, but this application is not limited thereto. The positioning pin 26 is able to run through the corresponding positioning hole 16 to avoid failure of the collection terminal 15 caused by inverse mounting. Understandably, in other embodiments, the positioning pin 26 and the positioning hole 16 are also omissible.

Referring to FIG. 3, one positioning pin 26 is disposed on one side of each first bracket 2. The positioning pin 26 of the first fixing bracket 2a is located on a side away from the connecting structure 1. Positioning holes 16 of the connecting structure 1 correspond to a plurality of positioning pins 26 of a plurality of first brackets 2 toward the connecting structure 1. One of two adjacent first brackets 2 is mounted by rotating 180° in a plane perpendicular to the first direction X, and a total quantity of the positioning pins 26 of the plurality of first brackets toward the connecting structure 1 is four. Therefore, correspondingly, a total quantity of the positioning holes 16 of the connecting structure 1 is four. The positioning hole 16 allows the corresponding positioning pin 26 of the first bracket 2 to move a preset distance in the positioning hole along the first direction X toward the first bracket 2 but away from the first fixing bracket 2a, thereby further improving evenness of expansion of the battery cell 1001 between the two first brackets 2 and the first fixing bracket 2a.

Figure 10:
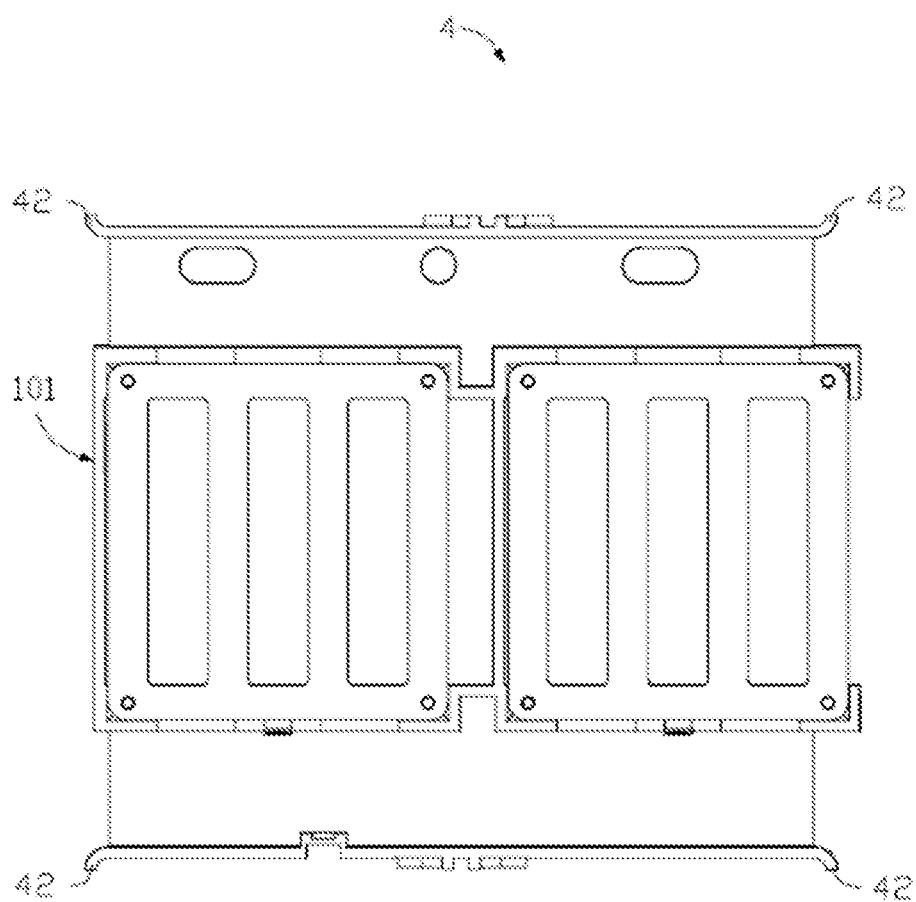
FIG. 10 is a schematic structural diagram of a part of a battery module unit shown in FIG. 9.

Referring to FIG. 9 and FIG. 10, the battery module unit 100 further includes a connecting structure 4. The connecting structure 4 is disposed on one side of the plurality of first brackets 2 away from the connecting structure 1. The clasp 235 is clasped with the connecting structure 4 so that the plurality of first brackets 2, the first fixing bracket 2a, and the connecting structure 4 are settled in the second direction Y and the third direction Z. Two lugs 42 are disposed on the two sides of the connecting structure 4 respectively. Every two lugs 42 abut against outer sides of the two protruding portions 31 of the second bracket 3 respectively, and therefore, the plurality of the first brackets 2, the first fixing bracket 2a, and the two second brackets 3 abut against and fix the battery cells 1001 respectively. The connecting structure 4 and the connecting structure 1 are located on two sides of the plurality of first brackets 2, the first fixing bracket 2a, and the two second brackets 3, respectively, thereby improving the strength of the battery module unit 100. Understandably, in other embodiments, the connecting structure 4 is omissible.

Referring to FIG. 1, the energy storage system 300 further includes a plurality of connecting plates 303. Two ends of each connecting plate 303 are connected to two adjacent battery modules 200 respectively. Specifically, threaded holes 17 are disposed on the two sides of the connecting structure 1. The connecting plate 303 is threadedly connected to the threaded hole 17 by the fastener 305, and the connecting plate 303 fits snugly onto the busbar 14. The connecting plate 303 is roughly a U-shaped sheet structure. The connecting plate 303 can extend and elastically deform along the first direction X, so as to allow two adjacent battery modules 200 to move along the first direction X. Understandably, in other embodiments, the connecting plate 303 is omissible.

Understandably, in other embodiments, the energy storage system 300 may omit the binding tape 301, and a plurality of battery modules 200 are connected and fixed by the connecting plate 303 or by other means.

Referring to FIG. 5 and FIG. 9, at least one set of oppositely arranged guide hole 33 and guide rod 36 is disposed on two adjacent second brackets 3 in two adjacent battery modules 200. The guide rod 36 can be inserted into the guide hole 33 to provide guidance in the first direction X for mounting of the two battery modules 200. Understandably, in other embodiments, the guide hole 33 and the guide rod 36 are omissible.

In some embodiments, the binding tape 301 is a steel tape, but is not limited to a steel tape.

Understandably, in other embodiments, the first fixing bracket 2a may be connected to the connecting structure 1 by screw threads or an adhesive. The plurality of first brackets 2 other than the first fixing bracket 2a may omit the first bulge 231 and the second bulge 233. The fasteners 23 of the first brackets 2 and the first fixing bracket 2a include two clasps 235 oppositely disposed on the bracket body 21. The two clasps 235 are located on the two sides of the connecting structure 1, and abut against the connecting structure 1. In this way, the first brackets 2, the first fixing bracket 2a, and the connecting structure 1 are settled in the second direction Y and the third direction Z.

Understandably, in other embodiments, the two adjacent first brackets 2 may adopt different structures so that the two adjacent first brackets 2 do not need to be mounted by rotating 180°.

Understandably, in other embodiments, the fastener 23 may be disposed on the first fixing bracket 2a alone in the battery module unit 100. The fastener 23 includes merely a first bulge 231. The first bulge 231 fits with the first positioning slot 11 of the connecting structure 1 so that the first fixing bracket 2a is fixed to the connecting structure 1. The battery module 200 further includes another binding tape (not shown in the drawing). A plurality of first brackets 2 and/or the second bracket 3 are fixed to the connecting structure 1 by using the other binding tape.

Understandably, in other embodiments, the energy storage system 300 may omit the binding tape 301, the connecting plate 303, and the fastener 305. The energy storage system 300 includes the battery module unit 100.

Second Embodiment

Figure 11:
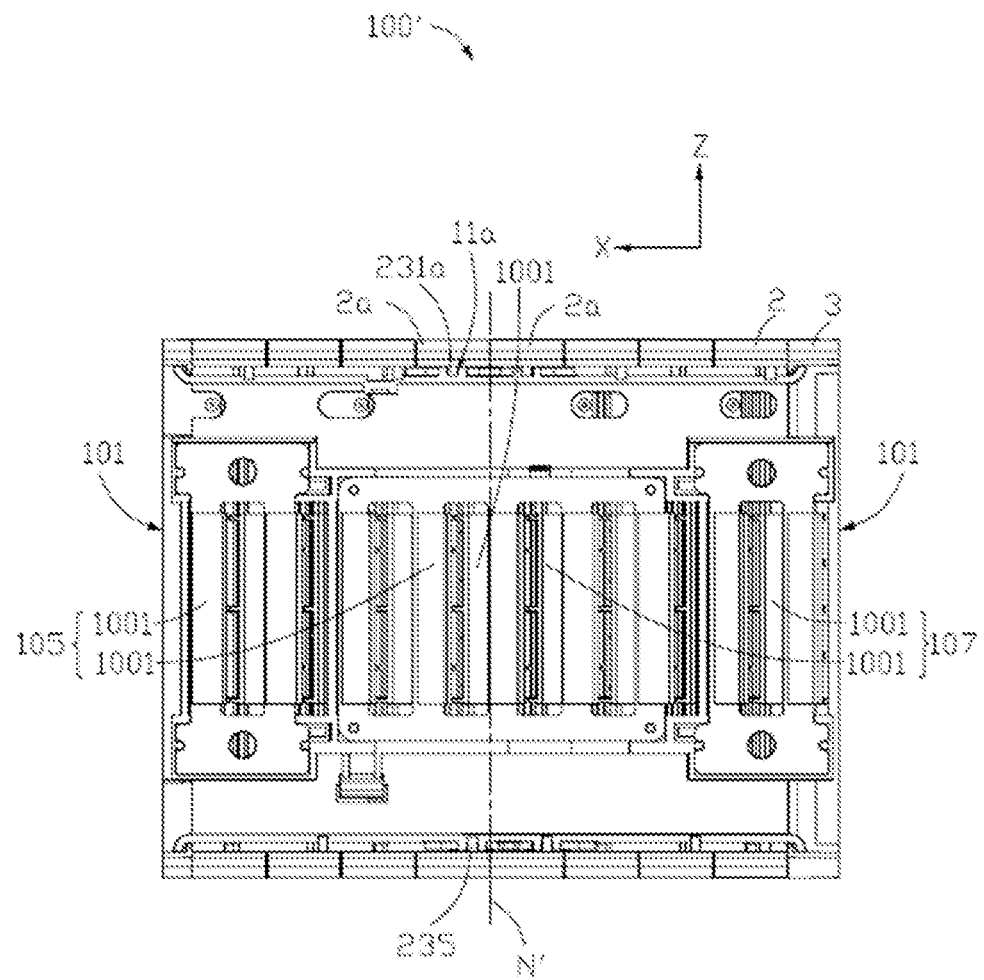
FIG. 11 is a schematic structural diagram of a battery module according to a second embodiment.

Referring to FIG. 11, a battery module unit 100' is basically identical to the battery module unit 100 in structure, but differs in that the quantity of the first brackets 2 of the battery module unit 100' is eight and that the quantity of the first fixing brackets 2a is two. The two first fixing brackets 2a are symmetric around a symmetric central axis N' of a plurality of first brackets 2 in the first direction X and are adjacent to the symmetric central axis N'. A symmetric central axis of the two first fixing brackets 2a coincides with the symmetric central axis N'. The two first fixing brackets 2a are fixed to the connecting structure 1. Notches 24, 24a, 34, and 34a and insets 25, 25a, 35, and 35a are omitted. A battery cell 1001 is accommodated and settled by two first fixing brackets 2a. The first battery cell group 105 is located between a first fixing bracket 2a and the first end 101. The second battery cell group 107 is located between another first fixing bracket 2a and the second end 103. The first battery cell group 105 is symmetric to the second battery cell group 107 around the symmetric central axis of the two first fixing brackets 2a. The two first fixing brackets 2a are arranged fourth and fifth respectively in eight first brackets 2. Among the eight first brackets 2, the four battery cells 1001 fixed by the first to third first brackets 2 on one side of the number-four first fixing bracket 2a toward the first end 101 and fixed by one second bracket 3 form the first battery cell group 105. Among the eight first brackets 2, the four battery cells 1001 fixed by the sixth to eighth first brackets 2 on the other side of the number-five first fixing bracket 2a and fixed by the other second bracket 3 form the second battery cell group 107. In this embodiment, the two first fixing brackets 2a are arranged adjacent to each other. In other embodiments, the two first fixing brackets 2a may be not adjacent to each other. For example, the two first fixing brackets 2*a* may be interspaced with other first brackets or first fixing brackets, but this application is not limited thereto.

A first bulge 231*a* is disposed on the first fixing bracket 2*a*. Two first positioning slots 11 corresponding to the two first fixing brackets 2*a* are disposed on the connecting structure 1. The first bulge 231*a* can be fitted into the corresponding first positioning slot 11 to settle the first fixing bracket 2*a* and the connecting structure 1 in the first direction X. The fastener 23 of each first bracket 2 and each first fixing bracket 2*a* includes a first bulge 231/231*a* and a clasp 235. The first bulge 231/231*a* and one abutting surface 2351 of clasp 235 abut on two opposite sides of the connecting structure 1 in opposite directions. The clasp 235 and the bracket body 21 abut on the two opposite sides of the connecting structure 1 in opposite directions. In this way, the first bracket 2, the first fixing bracket 2*a*, and the connecting structure 1 are settled in the second direction Y and the third direction Z.

The first battery cell group 105 is symmetric to the second battery cell group 107 around a symmetric central axis of the two first fixing brackets 2. In this way, a total distance by which the three first brackets 2*a* on one side of the first fixing bracket 2*a* can move is equal to a total distance by which the three first brackets on the other side of the first fixing bracket can move; and a cumulative expansion distance of the battery cells 1001 on one side of the first fixing bracket 2*a* is equal to a cumulative expansion distance of the battery cells on the other side of the first fixing bracket. In this way, the first battery cell group 105 and the second battery cell group 107 expand evenly. In this embodiment, the symmetric central axis of the two first fixing brackets 2*a* is the symmetric central axis N' of the plurality of first brackets 2 in the first direction X, but other embodiments are not limited thereto.

Understandably, in other embodiments, a second bulge 233/233*a* may be further disposed on each first bracket 2 and each first fixing bracket 2*a* to abut against the connecting structure 1 on a side away from the first bulge 231/231*a* to enhance connection strength.

Third Embodiment

Figure 12:
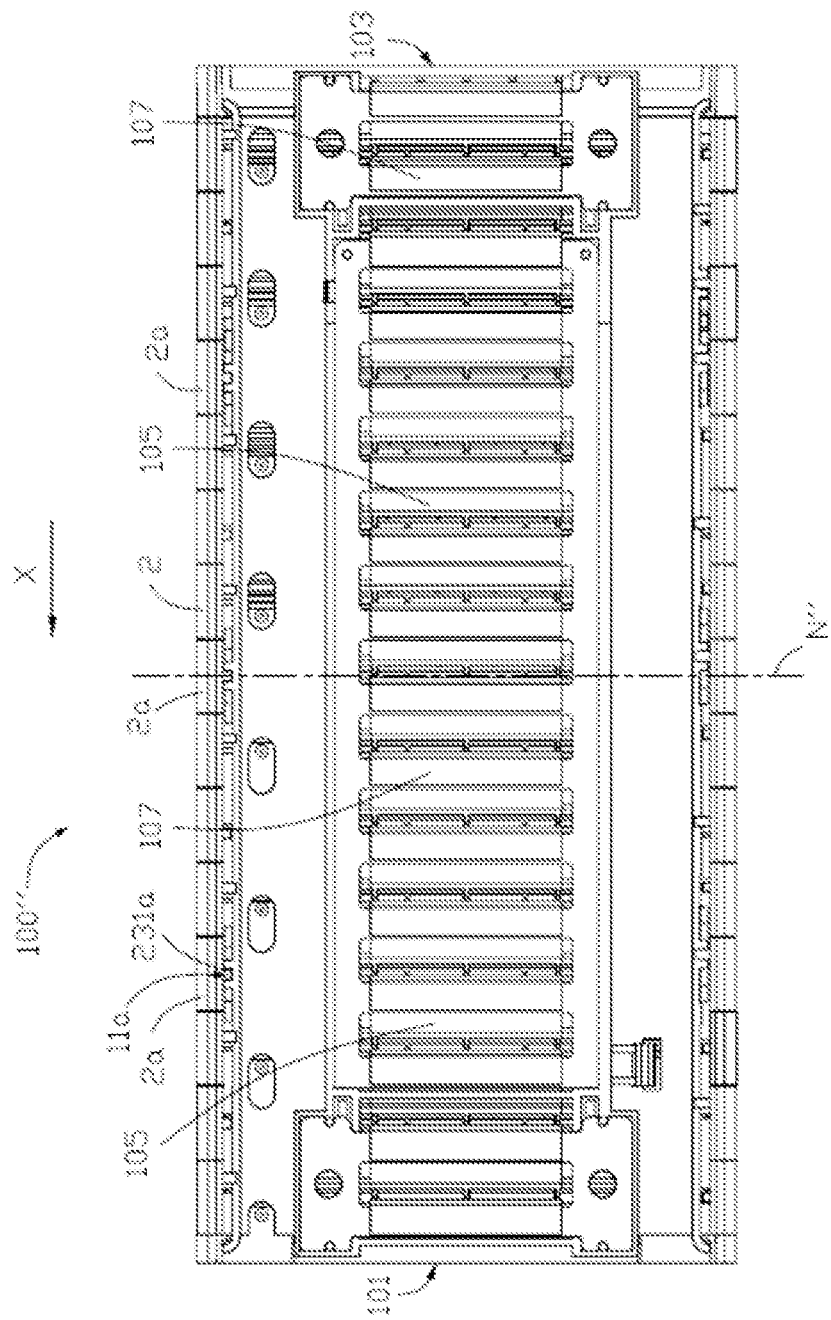
FIG. 12 is a schematic structural diagram of a battery module according to a third embodiment.

Referring to FIG. 12, a battery module unit 100" is basically identical to the battery module unit 100 in structure, but differs in that the quantity of the first brackets 2 of the battery module unit 100" is fifteen and that the quantity of the first fixing brackets 2*a* is three. The quantity of the first battery cell groups 105 is two, and the quantity of the second battery cell groups 107 is two. Specifically, one of the three first fixing brackets 2*a* is located at a symmetric central axis N" of the fifteenth first brackets 2 in the first direction X, and the remaining two are located in two positions that are symmetric around the symmetric central axis N". Specifically, the three first fixing brackets 2*a* are arranged fourth, eighth, and twelfth respectively in the plurality of first brackets 2 along the first direction X. The three first fixing brackets 2*a* are fixed to the connecting structure 1. A symmetric central axis of the three first fixing brackets 2*a* coincides with the symmetric central axis N', but other embodiments are not limited thereto.

Among the fifteen first brackets 2, the four battery cells 1001 fixed by the first to third first brackets 2 on one side of the number-four first fixing bracket 2*a* toward the first end 101 and fixed by one second bracket 3 located at the first end 101 form the first battery cell group 105. Among the fifteen first brackets 2, the four battery cells 1001 fixed by the fifth to seventh first brackets 2 located between the number-four first fixing bracket 2*a* and the number-eight first fixing bracket 2*a* form the second battery cell group 107. Among the fifteen first brackets 2, the four battery cells 1001 fixed by the ninth to eleventh first brackets 2 located between the number-eight first fixing bracket 2*a* and the number-twelve first fixing bracket form another first battery cell group 105. Among the fifteen first brackets 2, the four battery cells 1001 fixed by the thirteenth to fifteenth first brackets 2 on one side of the number-twelve first fixing bracket 2*a* toward the second end 103 and fixed by the other second bracket 3 located at the second end 103 form another second battery cell group 107. A first bulge 231*a* is disposed on the first fixing bracket 2*a*. Three first positioning slots 11 corresponding to the three first fixing brackets 2*a* are disposed on the connecting structure 1. The first bulge 231*a* can be fitted into the corresponding first positioning slot 11 to settle the first fixing bracket 2*a* and the connecting structure 1 in the first direction X. Three first fixing brackets 2*a* are fixed to the connecting structure 1. In this way, a total distance by which the three first brackets 2 on one side of each first fixing bracket 2*a* can move is equal to a total distance by which the three first brackets on the other side of the first fixing bracket can move. A cumulative expansion distance of the battery cells 1001 of the first battery cell group 105 and the second battery cell group 107 on one side of the first fixing bracket 2*a* is equal to a cumulative expansion distance of the cells on the other side of the first fixing bracket. In this way, the first battery cell group 105 and the second battery cell group 107 expand evenly.

Understandably, in other embodiments, the quantity of the first brackets 2 of the battery module unit 100" may also be nineteen or another quantity. When the quantity of the first brackets 2 is nineteen, a first bulge 231*a* may be disposed on the number-five, number-ten, and number-fifteen first fixing brackets 2*a* along the first direction X to fit into the three first positioning slots 11 on the connecting structure 1. In this way, the total distance by which the four first brackets 2 on one side of each first fixing bracket 2*a* can move is equal to a total distance by which the four first brackets on the other side can move.

This application further discloses an electric vehicle (not shown in the drawing) including the battery module unit 100 or the battery module 200.

As can be seen from the first to third embodiments, at least one first fixing bracket 2*a* in a plurality of first brackets 2 is fixed to the connecting structure 1, and remaining first brackets 2 can move along the first direction X under an expansion effect of the battery cell 1001. The first battery cell group 105 is symmetric to the second battery cell group 107 around a plurality of first fixing brackets 2*a* or around the symmetric central axis of the plurality of first fixing brackets 2*a* in the first direction X, where the first battery cell group and the second battery cell group are respectively located on two sides of each first fixing bracket 2*a* fixed to the connecting structure 1. In this way, the battery cells 1001 in the first battery cell group 105 and the second battery cell group 107 expand evenly along the first direction X.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and conception of the technical solutions of this application.

The invention claimed is:

1. A battery module unit, configured to form a battery module, wherein the battery module unit comprises:
    a plurality of sequentially stacked first brackets and a plurality of battery cells, wherein each first bracket comprises a bracket body, and a battery cell is accommodated between two adjacent bracket bodies;
    the plurality of first brackets comprise at least one first fixing bracket, and the at least one first fixing bracket is disposed between other first brackets;
    at least one battery cell on one side of the first fixing bracket forms a first battery cell group;
    at least one battery cell on an other side of the first fixing bracket forms a second battery cell group;
    a connecting structure is disposed at one end of a plurality of the bracket bodies,
    a fastener is disposed on the bracket body of the first fixing bracket, and the fastener of the first fixing bracket is fixed to the connecting structure to fix the connecting structure to the first fixing bracket in a first direction, wherein the first direction is a stacking direction of the plurality of first brackets,
    the first battery cell group is symmetric to the second battery cell group around a symmetric central axis of the first fixing bracket, or the first battery cell group is symmetric to the second battery cell group around a symmetric central axis of a plurality of the first fixing brackets,
    a busbar configured to connect tabs of the battery cell, and the busbar is fixed to the connecting structure,
    a positioning pin is disposed on at least one first bracket, and a corresponding positioning hole is disposed on the connecting structure; and
    the positioning pin is configured to run through the corresponding positioning hole,
    wherein the positioning pin is configured to move a preset distance in the positioning hole along a direction parallel to the first direction.

2. The battery module unit according to claim 1, wherein a quantity of battery cells in the first battery cell group is equal to that in the second battery cell group.

3. The battery module unit according to claim 2, wherein the fastener comprises a first bulge;
    a first positioning slot corresponding to the first bulge is disposed on a sidewall of the connecting structure, and the first positioning slot fits with and is fixed to the first bulge.

4. The battery module unit according to claim 3, wherein the fastener comprises a second bulge;
    the second bulge and the first bulge are located on two sides of the bracket body respectively;
    a second positioning slot corresponding to the second bulge is disposed on one side of the connecting structure away from the first positioning slot, and the second positioning slot fits with and is fixed to the second bulge.

5. The battery module unit according to claim 1, wherein each first bracket comprises the fastener, the fastener comprises a first bulge and a clasp, the first bulge and the clasp are located on two sides of the connecting structure respectively, the first bulge abuts against the connecting structure, and the clasp is clasped with the connecting structure.

6. The battery module unit according to claim 5, wherein the clasp comprises two intersecting abutting surfaces;
    one of the abutting surface) and the bracket body abut on two opposite sides of the connecting structure in opposite directions; and
    the other abutting surface and the first bulge abut on the two opposite sides of the connecting structure in opposite directions.

7. The battery module unit according to claim 1, wherein the battery module unit further comprises two second brackets, the two second brackets are disposed on two sides of the plurality of first brackets along the first direction, and the battery cell is accommodated between each second bracket and an adjacent first bracket;
    a protruding portion is disposed on the second bracket; and
    two lugs are disposed on two sides of the connecting structure along the first direction respectively, and the two lugs are fixed to the protruding portion of the second bracket respectively.

8. The battery module unit according to claim 1, wherein at least one set of notch and inset are disposed on both sides of the bracket body of the first bracket along the first direction; and
    the notch of the first bracket is able to fit with an inset of another adjacent first bracket.

9. The battery module unit according to claim 8, wherein notches and insets are symmetrically disposed on sidewalls of the bracket body located on two sides of the connecting structure, and the notches and the insets located on two sides of each sidewall are symmetrically distributed; of two adjacent first brackets, one is mounted by rotating 180° against the other in a plane perpendicular to the first direction.

10. The battery module unit according to claim 8, wherein each first bracket comprises the fastener, and the fastener comprises a clasp;
    the clasp comprises two intersecting abutting surfaces, one of the abutting surfaces and the bracket body abut on two opposite sides of the connecting structure in opposite directions; and
    the other abutting surface of two clasps located on two sides of the connecting structure abut on the two opposite sides of the connecting structure in opposite directions.

11. The battery module unit according to claim 1, wherein a first positioning pin is disposed on one first bracket disposed one side of first fixing bracket, and a corresponding positioning hole is disposed on the connecting structure, the first positioning pin is configured to run through the corresponding positioning hole;
    a second positioning pin is disposed on another first bracket disposed on another side of the first fixing bracket, and a corresponding positioning hole is disposed on the connecting structure, the second positioning pin is configured to run through the corresponding positioning hole.

12. The battery module unit according to claim 11, wherein the first positioning pin and the second positioning pin are symmetric around a symmetric central axis of the first fixing bracket, or the first positioning pin and the second positioning pin are symmetric around a symmetric central axis of a plurality of the first fixing brackets; both of the first positioning pin and the second positioning pin are configured to move a preset distance in the positioning hole along the direction parallel to the first direction.

13. The battery module unit according to claim 1, wherein a collection terminal is further disposed on the busbar, and the collection terminal is located on one side of the busbar.

14. The battery module unit according to claim 1, wherein the busbar is connected to the fixing bracket by hot melting or by an adhesive or screw threads.

15. A battery module, comprising at least one battery module unit and a binding tape, wherein the binding tape is disposed outside the at least one battery module unit to fix the battery module unit, wherein the battery module unit is the battery module unit according to claim 1.

16. An energy storage system, wherein the energy storage system comprises the battery module unit according to claim 1.

17. An electric vehicle, wherein the electric vehicle comprises the battery module unit according to claim 1.

* * * * *